Oct. 13, 1959     J. P. ATERNO ET AL     2,908,609
METHOD OF TREATING BOVINE MASTITIS
Filed May 9, 1956
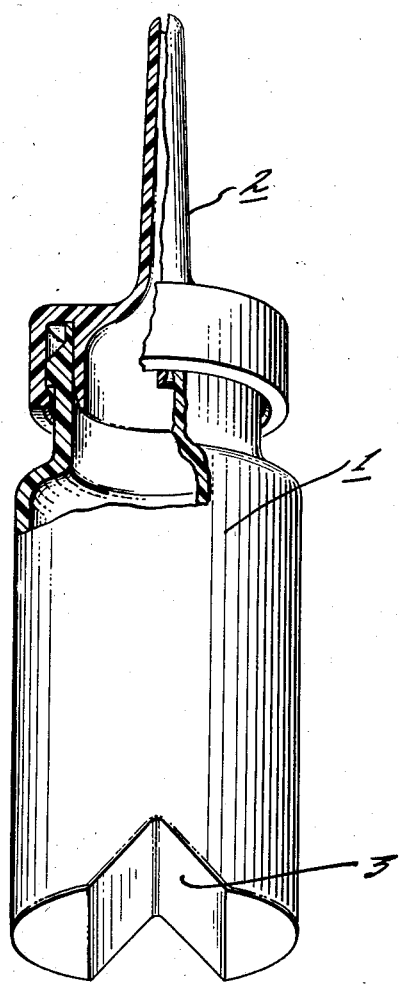
INVENTORS.
Joseph P. Aterno,
Herbert G. Luther,
Gail E. Hawley &
Edward M. Sacchi
BY Connolly and Hutz
THEIR ATTORNEYS

United States Patent Office 2,908,609
Patented Oct. 13, 1959

2,908,609

METHOD OF TREATING BOVINE MASTITIS

Joseph P. Aterno, Brooklyn, N.Y., and Herbert G. Luther, Gail E. Hawley, and Edward M. Sacchi, Terre Haute, Ind., assignors to Chas. Pfizer & Co., Inc., New York, N.Y., a corporation of Delaware Application May 9, 1956, Serial No. 583,686

4 Claims. (Cl. 167—53.2)

This invention relates to antibiotic compositions useful in the treatment of bovine mastitis, and more particularly, to dry antibiotic compositions which are particularly suited for this purpose and to methods of administering the same.

Bovine mastitis is a serious condition which occurs rather widely in cattle, but is especially troublesome in the dairy industry. It is caused by a variety of pathogenic microorganisms, and for this reason it is frequently very difficult to treat or control. The cows which are affected by this condition cannot be used for milk production, and in fact, very great care must be taken to assure that the milk from such animals is not consumed by humans or other animals.

With the advent of antibiotics, great strides have been taken in the control of mastitis, but there are still difficulties with the ordinary preparations which have been used for this purpose. For example, the most common form of antibiotic treatment involves the use of antibiotic ointments or suspensions which are injected into the various quarters of infected animals to make the antibiotic content of such compositions available at the site of infection. These preparations have not been entirely satisfactory, since the antibiotic is often not readily suspended or dissolved in the milk of the animal, due to the nature of the formulations employed. Moreover, serious problems are often encountered in maintaining the stability and/or desired potency of the antibiotics when such preparations are stored prior to use. It is a well-known fact that many antibiotics tend to deteriorate or lose potency in the presence of water or other ingredients commonly used for formulating various antibiotic dosage forms. In addition, many ordinary antibiotic mastitis preparations are rather slow acting, i.e. they do not readily suspend or dissolve in the milk of the animal, and therefore, they do not act as promptly on the pathogenic microorganisms which are causing the mastitis.

It has now been found that these difficulties can be overcome by providing dry antibiotic compositions of a particular type, which are designed to be administered in a unique and novel manner by employing the milk of the infected animal as the suspending agent for the antibiotic compositions. The preferred method of administration, which will be more fully described hereinafter, involves the withdrawal of a portion of milk from the infected quarter to suspend and/or dissolve the antibiotic composition, and injection of the resulting antibiotic-milk suspension and/or solution back into the infected quarter to obtain prompt and effective antibiotic concentration at the site of the infection.

A wide variety of antibiotics are suitable for the preparation of compositions for use in accordance with the present invention. The broad spectrum antibiotics, such as oxytetracycline, tetracycline and chlortetracycline, are particularly effective against many of the organisms causing mastitis. Many forms of penicillin, including both the water-soluble forms and the sparingly water-soluble forms, are highly effective against certain gram-positive microorganisms which cause mastitis, and therefore, they are also suitable. Examples of these are potassium penicillin, sodium penicillin, procaine penicillin, dibenzylethylenediamine penicillin, N-benzyl-N'-(3-ethoxy-4-hydroxy)-benzyl-ethylenediamine penicillin and 2-chloroprocaine penicillin. Furthermore, the various forms of polymyxin are advantageous in these compositions, especially polymyxin B. In addition, the compositions may contain other antibiotics designed to extend the spectrum of the resulting product such as carbomycin, streptomycin, dihydrostreptomycin, neomycin, bacitracin, and the like. The antibiotics may be present in amphoteric form, as free bases or in the form of acid or alkaline addition salts, such as alkali metal and alkaline earth metal salts, hydrochlorides, sulfates, phosphates and also various metal complexes, depending upon the pH desired in the ultimate milk suspension which results upon administration. Various mixtures of the aforesaid and other antibiotics are especially useful, since such mixtures broaden the spectrum of the compositions and enable control of a much wider variety of microorganisms, including those that may be resistant to one or more of the antibiotics usually employed in the treatment of mastitis. Moreover, many of these combinations are synergistic, i.e. they result in a much higher activity in combination than could be expected from the known activity of each antibiotic when administered separately. In some instances, other drugs such as the sulfa drugs and nitrofurazones may also be employed in conjunction with the antibiotics to further extend the spectrum of the compositions, but this is generally not necessary where the proper selection of antibiotics is made.

It is very important to select a combination of antibiotics which when dissolved in the milk of the animal under treatment will not precipitate casein from the milk. In this connection, it has been found that the resulting solution or suspension should exhibit a pH of at least 4, and preferably between about 5 to 7, for optimum results. A pH of 6 is especially advantageous. This is readily accomplished by selecting the proper form of the antibiotic, i.e., by using amphoteric forms or basic or acidic salts, depending upon the particular antibiotic combination employed. Various buffers, such as alkali metal salts of polybasic organic acids, i.e. sodium citrate, may also be employed in the compositions to achieve the desired pH control in the final solution or suspension. Other suitable buffers include sodium acetate, sodium lactate, and alkali metal sats of inorganic acids, such as monobasic and dibasic sodium phosphates. For example, if the compositions contain only antibiotic hydrochloride salts, an alkalizing buffer such as trisodium citrate, is useful in bringing the pH to the proper value. For most purposes, about 0.5 to 2.0% of the buffer by weight of the antibiotic content of the composition is adequate when a buffer is required. However, it will be appreciated that the amount of buffer, if any, will vary considerably, depending upon the particular antibiotics selected and the forms in which they are employed.

The invention is further illustrated by the following examples of various antibiotic formulations which may be employed to achieve the purposes herein set forth. However, it is understood that the invention is not to be limited by these examples, since resort may be had to various modifications and equivalents as fall within the spirit of the invention and the scope of the appended claims.

Example 1

| | |
|---|---|
| Oxytetracycline base _____ mg__ | 300 |
| Oxytetracycline hydrochloride _____ mg__ | 126 |
| Potassium penicillin _____ units__ | 200,000 |
| Polymyxin B sulfate _____ do____ | 150,000 |
| Dihydrostreptomycin _____ mg__ | 200 |
| Carbomycin base _____ mg__ | 100 |

Example 2

| | | |
|---|---|---|
| Dihydrostreptomycin sulfate | mg | 200 |
| Neomycin sulfate | mg | 100 |
| Polymyxin B sulfate | units | 150,000 |
| Carbomycin base | mg | 100 |

Example 3

| | | |
|---|---|---|
| Dihydrostreptomycin sulfate | mg | 200 |
| Polymyxin B sulfate | units | 150,000 |
| Oxytetracycline HCl | mg | 200 |

Example 4

| | | |
|---|---|---|
| Dihydrostreptomycin sulfate | mg | 200 |
| Polymyxin B sulfate | units | 150,000 |
| Oxytetracycline base | mg | 200 |

Example 5

| | | |
|---|---|---|
| Potassium penicillin | units | 300,000 |
| Dihydrostreptomycin sulfate | mg | 300 |
| Polymyxin B sulfate | units | 300,000 |
| Oxytetracycline hydrochloride | mg | 300 |

Example 6

| | | |
|---|---|---|
| Potassium penicillin | units | 300,000 |
| Dihydrostreptomycin sulfate | mg | 300 |
| Polymyxin B sulfate | units | 300,000 |
| Oxytetracycline base | mg | 300 |

Example 7

| | | |
|---|---|---|
| Procaine penicillin | units | 300,000 |
| Dihydrostreptomycin sulfate | mg | 300 |
| Polymyxin sulfate | units | 300,000 |
| Oxytetracycline HCl | mg | 300 |

Example 8

| | | |
|---|---|---|
| Procaine penicillin | mg | 300 |
| Dihydrostreptomycin sulfate | mg | 300 |
| Polymyxin B sulfate | units | 300,000 |
| Oxytetracycline base | mg | 300 |

Example 9

| | | |
|---|---|---|
| Dihydrostreptomycin sulfate | mg | 300 |
| Neomycin sulfate | mg | 100 |
| Oxytetracycline HCl | mg | 300 |

Example 10

| | | |
|---|---|---|
| Dihydrostreptomycin sulfate | mg | 300 |
| Neomycin sulfate | mg | 100 |
| Oxytetracycline base | mg | 300 |

Example 11

| | | |
|---|---|---|
| Potassium penicillin | units | 200,000 |
| Dihydrostreptomycin sulfate | mg | 200 |
| Neomycin sulfate | mg | 100 |
| Polymyxin B sulfate | units | 200,000 |

Example 12

| | | |
|---|---|---|
| Procaine penicillin | units | 200,000 |
| Dihydrostreptomycin sulfate | mg | 200 |
| Neomycin sulfate | mg | 100 |
| Polymyxin B sulfate | units | 200,000 |

Example 13

| | | |
|---|---|---|
| Potassium penicillin | units | 200,000 |
| Dihydrostreptomycin sulfate | mg | 200 |
| Polymyxin B sulfate | units | 200,000 |
| Oxytetracycline HCl | mg | 200 |

Example 14

| | | |
|---|---|---|
| Potassium penicillin | units | 200,000 |
| Dihydrostreptomycin sulfate | mg | 200 |
| Polymyxin B sulfate | units | 200,000 |
| Oxytetracycline base | mg | 200 |

Example 15

| | | |
|---|---|---|
| Procaine penicillin | units | 200,000 |
| Dihydrostreptomycin sulfate | mg | 200 |
| Polymyxin B sulfate | units | 200,000 |
| Oxytetracycline HCl | mg | 200 |

Example 16

| | | |
|---|---|---|
| Procaine penicillin | units | 200,000 |
| Dihydrostreptomycin sulfate | mg | 200 |
| Polymyxin B sulfate | units | 200,000 |
| Oxytetracycline base | mg | 200 |

Example 17

| | | |
|---|---|---|
| Dihydrostreptomycin sulfate | mg | 500 |
| Polymyxin B sulfate | units | 150,000 |
| Carbomycin base | mg | 100 |

Example 18

| | | |
|---|---|---|
| Dihydrostreptomycin sulfate | mg | 500 |
| Oxytetracycline HCl | mg | 250 |

Example 19

| | | |
|---|---|---|
| Dihydrostreptomycin sulfate | mg | 500 |
| Oxytetracycline base | mg | 250 |

Example 20

| | | |
|---|---|---|
| Potassium penicillin | units | 500,000 |
| Dihydrostreptomycin sulfate | mg | 500 |
| Polymyxin B sulfate | units | 150,000 |

Example 21

| | | |
|---|---|---|
| Procaine penicillin | units | 500,000 |
| Dihydrostreptomycin sulfate | mg | 500 |
| Polymyxin B sulfate | units | 150,000 |

Example 22

| | | |
|---|---|---|
| Potassium penicillin | units | 400,000 |
| Dihydrostreptomycin sulfate | mg | 500 |
| Polymyxin B sulfate | units | 150,000 |
| Carbomycin base | mg | 100 |

Example 23

| | | |
|---|---|---|
| Procaine penicillin | units | 400,000 |
| Dihydrostreptomycin sulfate | mg | 500 |
| Polymyxin B sulfate | units | 150,000 |
| Carbomycin base | mg | 100 |

Example 24

| | | |
|---|---|---|
| Polymyxin B sulfate | units | 150,000 |
| Tetracycline HCl | mg | 500 |

Example 25

| | | |
|---|---|---|
| Polymyxin B sulfate | units | 150,000 |
| Tetracycline base | mg | 500 |

Example 26

| | | |
|---|---|---|
| Dihydrostreptomycin sulfate | mg | 200 |
| Polymyxin B sulfate | units | 150,000 |
| Tetracycline HCl | mg | 400 |

Example 27

| | | |
|---|---|---|
| Dihydrostreptomycin sulfate | mg | 200 |
| Polymyxin B sulfate | units | 150,000 |
| Tetracycline base | mg | 400 |

Example 28

| | | |
|---|---|---|
| Dihydrostreptomycin sulfate | mg | 200 |
| Tetracycline HCl | mg | 100 |
| Polymyxin B sulfate | units | 100,000 |
| Neomycin sulfate | mg | 100 |
| Potassium penicillin | units | 200,000 |

Example 29

| | | |
|---|---|---|
| Tetracycline base | mg | 100 |
| Polymyxin B sulfate | units | 100,000 |
| Neomycin sulfate | mg | 100 |
| Procaine penicillin | units | 200,000 |
| Dihydrostreptomycin sulfate | mg | 200 |

Example 30

| | | |
|---|---|---|
| Tetracycline HCl | mg | 100 |
| Polymyxin B sulfate | units | 100,000 |
| Neomycin sulfate | mg | 100 |
| Procaine penicillin | units | 200,000 |
| Dihydrostreptomycin sulfate | mg | 200 |

Example 31

| | | |
|---|---|---|
| Tetracycline base | mg | 100 |
| Polymyxin B sulfate | units | 100,000 |
| Neomycin sulfate | mg | 100 |
| Procaine penicillin | units | 200,000 |
| Dihydrostreptomycin sulfate | mg | 200 |

Example 32

| | | |
|---|---|---|
| Tetracycline HCl | mg | 300 |
| Polymyxin B sulfate | units | 100,000 |
| Neomycin sulfate | mg | 100 |
| Dihydrostreptomycin sulfate | mg | 200 |

Example 33

| | | |
|---|---|---|
| Oxytetracycline base | mg | 300 |
| Polymyxin B sulfate | units | 100,000 |
| Neomycin sulfate | mg | 100 |
| Dihydrostreptomycin sulfate | mg | 200 |

Example 34

| | | |
|---|---|---|
| Oxytetracycline HCl | mg | 426 |
| Polymyxin B sulfate | units | 100,000 |

Example 35

| | | |
|---|---|---|
| Oxytetracycline base | mg | 426 |
| Polymyxin B sulfate | units | 150,000 |

Each of the foregoing compositions is intended to be employed for single-dose administration in an infected quarter of an animal afflicted with mastitis. Moreover, in each case, the particular combination of antibiotics set forth is such that, when the composition is dissolved or suspended in milk from the infected animal, the pH of the resulting solution or suspension will not precipitate the casein from the milk.

It is most important in preparing the compositions of this invention that the particle size of the various ingredients employed be carefully controlled in order to assure prompt and effective suspension of the antibiotics in the milk of the infected animal. For example, if the particles are too fine in size, the wettability and dispersibility of the compositions is adversely affected and administration of the compositions becomes exceedingly difficult. On the other hand, if the particles are sufficiently large, with adequate interstices for distribution of the milk, the compositions are much more readily suspended and administered. For best results, it has been found advantageous to employ antibiotic compositions having an average particle size of from about 100 to 150 microns, with at least 60% of the particles being over 100 microns in size. However, substantially none of the particles should be less than 40 microns nor larger than 300 microns in size.

In certain instances various surface-active and/or dispersing agents may be employed in the antibiotic compositions to accelerate the rate of suspension during administration. For example, suitable wetting agents are the following: Tweens (polyoxyethylene ethers of partial higher fatty acid esters of polyhydroxy alcohols, i.e. polyoxyalkylene derivatives of sorbitan monooleate); aryl alkyl polyether alcohols and their derivatives; alkali metal salts of aryl alkyl polyether alcohol sulfates; dialkyl esters of sodium sulfosuccinic acid; fatty acid esters of polyethylene glycol; and the like. Various other agents which are readily soluble in milk, such as sucrose, lactose, and sorbitol may also be employed to facilitate rapid distribution of the milk in the interstices between the antibiotic particles. Other diluents may also be employed, but these are not considered essential. However, the particle size of any diluent, including the dispersing agents, should preferably be as large or larger than the average particle size of the antibiotics employed.

As previously stated, the compositions of this invention are administered in accordance with a unique method which forms a part of the invention. For this purpose they are packaged in a container which is especially adapted for the withdrawal of a quantity of milk from an infected quarter of the animal to be treated to enable suspension of the composition in such milk. While various syringes could be employed for this purpose, it has been found much more advantageous to employ a container which is constructed of resilient material in such manner that compression of the container will expel the finished suspension and most of the air from the dry compositions, and release of the container will cause it to return to its original configuration. For withdrawing the milk and administering the finished suspension, the container is provided with a cannula or elongated tip which is suitable for insertion into the infected quarter of the infected animal to be treated.

A suitable container for the purposes set forth is shown in the accompanying drawing, wherein 1 is a vial or bottle constructed of resilient material, such as polyethylene. A cannula or elongated nozzle 2 is provided at the mouth of the container to facilitate withdrawal of milk from the infected animal and dispensing of the ultimate suspension to be prepared therewith. The base of the container is preferably provided with a V-shaped indentation 3, which assists in completely collapsing the container upon exertion of manual pressure on its outer side walls. It will be appreciated, of course, that a variety of containers of different design may be employed to achieve the same result.

In administering the compositions of this invention, a container such as that described, having a dry antibiotic composition therewithin, is first collapsed by exerting manual pressure on its outer side walls to exhaust as much air as possible from the container. While in this condition, the cannula of the container is then inserted into the infected quarter of the animal to be treated, and milk is withdrawn from the infected quarter into the container by gradually releasing the pressure exerted on the container by the one hand, while at the same time milking the animal with the other hand. The milk is then preferably passed several times back and forth between the container and the infected quarter, without withdrawing the cannular, until all of the antibiotic composition has been suspended. At this point the suspension is completely expelled into the infected quarter and the cannula of the container is withdrawn. In this manner, the antibiotic activity is rapidly transported to the site of the infection. For prompt suspension of the antibiotic compositions of this invention, it is advisable to withdraw initally as much milk as possible from the infected quarter, so that a maximum number of particles will be contacted on the first application of the milk to the dry product. To facilitate this action, it is preferred to employ a container of about 15 to 20 cc. in size and fill the container in such a manner so that only from about 25 to 50% of its volume is occupied by the dry compositions.

The compositions of this invention, when administered as previously described, have been found to be highly effective in obtaining prompt control of mastitis infection in a large proportion of animals treated in the manner described. In many instances, complete control of the infection has been obtained with only one application of the compositions containing the aforesaid antibiotics in the proportions set forth. However, in most cases, it is advisable to employ two or three treatments of each infected quarter at 24, 36 or 48 hour intervals in order to insure effective and sustained control of the infection. In exceptional cases, further applications may be required.

What is claimed is:

1. A method of treating bovine mastitis which comprises withdrawing a portion of milk from an infected animal through a cannula into a container attached to said cannula, the container having within it a dry antibiotic-containing powder which, when dissolved in said milk, exhibits a pH of at least 4; mixing said milk with said powder, thereby forming a suspension of said antibiotic powder in said milk; and injecting said suspension into an infected quarter of said animal.

2. A method of treating bovine mastitis which comprises withdrawing a portion of milk from an infected animal quarter through a cannula into a container attached to said cannula, the container having within it a dry mixture of antibiotics, the particles of which average from about 100 to 150 microns in size, and which, when dissolved in milk exhibits a pH of from about 5 to 7; mixing said milk with said antibiotics mixture, thereby forming a suspension of the antibiotics in said milk; and injecting said suspension into the infected animal quarter.

3. A method of treating bovine mastitis which comprises inserting into an infected animal quarter, the cannula of a container having therewithin a dry antibiotic-containing powder, the particles of which average about 100 to 150 microns in size, and which, when dissolved in milk, exhibits a pH of at least 4; withdrawing a portion of milk from said infected quarter into said container to form a suspension of said antibiotic powder in said milk; and injecting said suspension into the infected quarter.

4. A method of treating bovine mastitis which comprises inserting into an infected animal quarter, the cannula of a container having therewithin a dry mixture of antibiotics, the particles of which average from about 100 to 150 microns in size, and which, when dissolved in milk exhibits a pH of from about 5 to 7; withdrawing a portion of milk from said infected quarter into said container to form a suspension of said antibiotics in said milk; and, without withdrawing said cannula, injecting said suspension into the infected quarter.

References Cited in the file of this patent

UNITED STATES PATENTS

| | | |
|---|---|---|
| 2,498,374 | Martin | Feb. 21, 1950 |
| 2,507,193 | Buckwalter | May 9, 1950 |
| 2,728,704 | Edds et al. | Dec. 27, 1955 |

OTHER REFERENCES

Cole and Elman: "Textbook of General Surgery," 3d ed., 1942, Appleton-Century Co. Inc., pp. 186–7, esp. p. 186(c), 3d paragraph.

Modern Drugs, January 1955, p. 72.

"Mastitis Controlled," Lederle Labs., Inc., May 1946, p. 12, par. 4.

Slanetz and Allen: J. Am. Vet. Med. Assn., November 1950, p. 393, rt. hand column.